United States Patent [19]

Grinderslev et al.

[11] Patent Number: 5,664,039

[45] Date of Patent: Sep. 2, 1997

[54] HIGH DENSITY FIBER FERRULES AND CONNECTORS

[75] Inventors: Soren Grinderslev, Hummelstown; William Warren Drabenstadt, Camp Hill; Randy Marshall Manning, New Cumberland, all of Pa.

[73] Assignee: The Whitaker Corporation, Wilmington, Del.

[21] Appl. No.: 647,253

[22] Filed: May 13, 1996

Related U.S. Application Data

[60] Continuation of Ser. No. 439,065, May 9, 1995, abandoned, which is a division of Ser. No. 257,410, Jun. 8, 1994.

[51] Int. Cl.[6] ............................................ G02B 6/38
[52] U.S. Cl. ........................... 385/65; 385/59; 385/64; 385/71; 385/83
[58] Field of Search ........................... 385/54, 60, 62, 385/65, 71, 72, 78, 83, 85, 89, 82, 64

[56] References Cited

U.S. PATENT DOCUMENTS

| | | | |
|---|---|---|---|
| 4,179,186 | 12/1979 | Tynes | 385/70 X |
| 4,830,456 | 5/1989 | Kakii et al. | 385/71 X |
| 4,841,126 | 6/1989 | Graeber | 219/69.2 |
| 4,950,048 | 8/1990 | Kakii et al. | 385/83 |
| 4,952,263 | 8/1990 | Kakii et al. | 385/65 |
| 5,082,346 | 1/1992 | Myers | 385/65 X |
| 5,259,050 | 11/1993 | Yamakawa et al. | 385/59 |
| 5,268,981 | 12/1993 | Shahid | 385/71 |
| 5,287,426 | 2/1994 | Shahid | 385/85 |
| 5,315,678 | 5/1994 | Maekawa et al. | 385/59 |

FOREIGN PATENT DOCUMENTS

| | | | |
|---|---|---|---|
| 53-148456 | 12/1978 | Japan | 385/65 |
| 57-158824 | 9/1982 | Japan | 385/65 |

OTHER PUBLICATIONS

MT Connector, Multi-Fiber Connector, *The Office and to the Home*, 1990 no month available.

*Primary Examiner*—Rodney B. Bovernick
*Assistant Examiner*—Hemang Sanghavi

[57] ABSTRACT

Fiber array connectors of the type having a connector body and adapted to house a plurality of fibers which carry data through the connector. Ferrules are provided to the connectors which are formed by first ferrule members having configured thereon by an electrical discharge machining process at least one guide pin hole, and a plurality of grooves for housing a plurality of fibers in registration in the ferrules. The ferrules are also made up of second ferrule members in engagement with the plurality of grooves for clamping the plurality of fibers in registration in the grooves so that the plurality of fibers can be held in precise alignment with the connector and so that data is transmitted therethrough with a minimum possibility of transmission error.

3 Claims, 9 Drawing Sheets

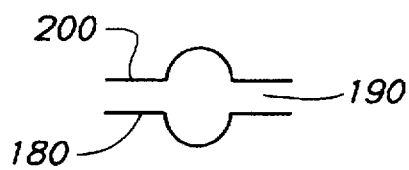
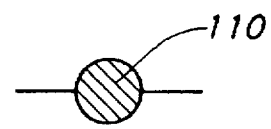
FIG. 6A  FIG. 6B
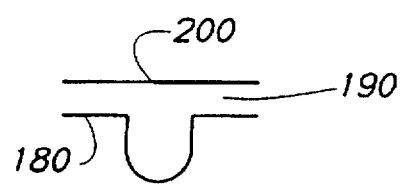
FIG. 7A  FIG. 7B
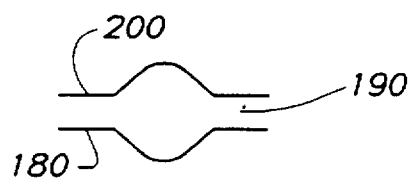
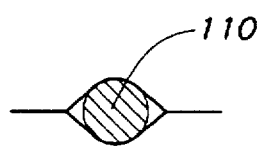
FIG. 8A  FIG. 8B
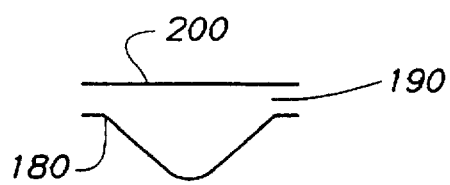
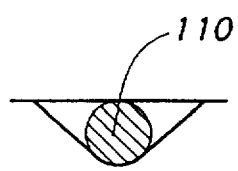
FIG. 9A  FIG. 9B

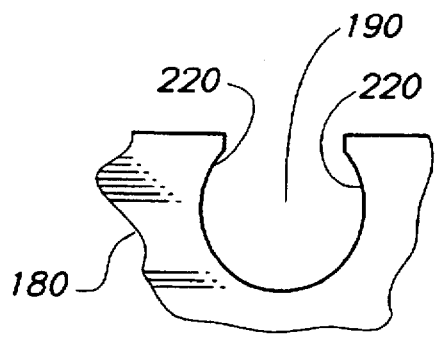
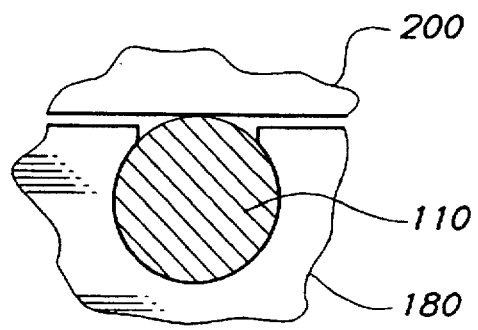
*FIG. 10A*  *FIG. 10B*
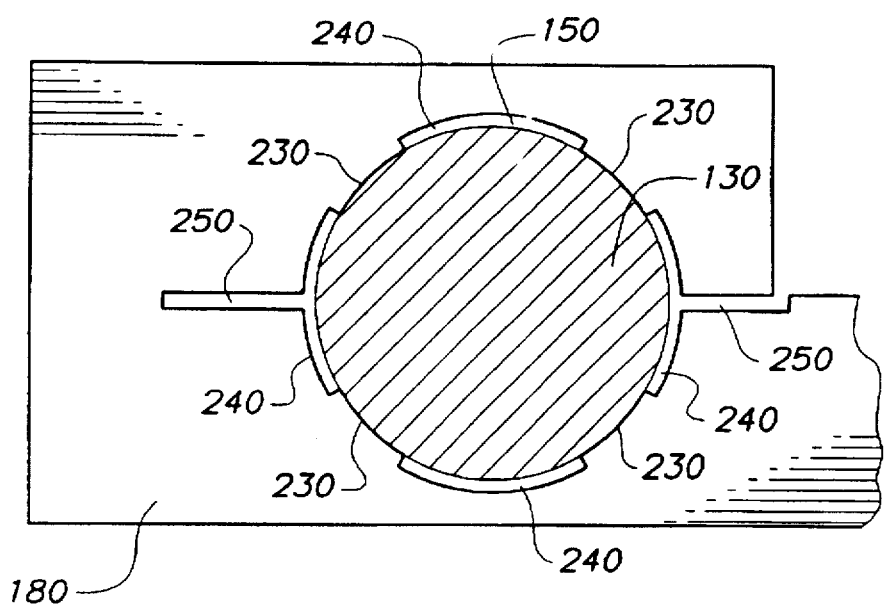
*FIG. 11*

HIGH DENSITY FIBER FERRULES AND CONNECTORS

This application is a continuation of application Ser. No. 08/439,065 filed May 9, 1995, now abandoned, in turn, a divisional of application Ser. No. 08/257,410 filed Jun. 8, 1994.

FIELD OF THE INVENTION

This invention relates generally to fiber array, ferrule connectors. More specifically, this invention relates to high density, fiber-optic connectors having fiber-optic arrays therein which are adapted to be held in registration throughout the connector so as to prevent data transmission problems due to misregistration of the individual fibers in the fiber optic array.

BACKGROUND OF THE INVENTION

Multifiber optical connectors provide high performance, single mode transmission of light beams through optical fibers, sometimes referred to as "waveguides", in optical fiber arrays found in the connectors. See, for example, U.S. Pat. No. 5,214,730, Nagasawa et al. Multifiber optical connectors such as those disclosed in the Nagasawa et al. and other patents generally are formed by a pair of multifiber optical connector plugs having spring members for pressing the multifiber optical connector plugs toward each other in an axial direction. Guide pins for aligning the multifiber optical connector plugs are provided in an attempt to hold the ends of the individual fibers in the fiber-optic arrays against one another in registration so as to ensure a good optical interface between the arrays, and therefore acceptable data transmission through the connector.

Generally, the connectors also comprise housings or "ferrules" which are adapted to hold the optical fibers in the connector in a fashion so as to secure registration of the two fiber-optic arrays found in the connector halves of the connectors. See, for example, U.S. Pat. No. 4,753,515 Sato et al. In order to secure the individual waveguides of the arrays in the ferrules, the waveguides are typically secured in the ferrules in "C-shaped" channel members. See Sato et al., column 2, lines 46–53. The fiber-optic array is further secured in the C-shaped channel by providing a bonding agent to the C-shaped channel and the array, thereby gluing the array into the ferrule. See Sato et al., column 3, lines 9–16.

Many arrangements have been proposed in the art for forming grooves in ferrules to hold individual fibers of a fiber-optic array therein. Conventionally, the grooves can be simply machined in the ferrules by standard mechanical machining techniques. Alternatively, it has been suggested to "etch" grooves in the ferrule, thereby creating V-shaped grooves to hold the fibers. See, for example, U.S. Pat. No. 4,657,341, Sammueller, column 3, lines 17–23. When etching is employed as described in the Sammueller patent, the ferrule must be made of an etchable material such as silicon, in order for the V-shaped grooves to be formed therein.

In the mechanical technique, etching technique, and other groove-forming techniques employed in the art, grooves are produced which unfortunately cannot consistently hold the individual fibers in registration in the ferrule, and so the individual waveguides tend to be only loosely registered in the grooves. Therefore, the individual waveguides can slightly move when the two halves of the connector are placed together, or when the connector is subject to movement from outside forces during use.

The prior multifiber optical connectors thus have the disadvantageous characteristic of misalignment of the fiber-optic arrays which must normally be closely joined together in order for optical data to be transmitted through the connector with speed and accuracy. The aforementioned connectors do not efficiently interface the waveguides in the separate connector halves since the ferrules found in these connectors are simply not machined with enough accuracy to ensure a reliable optical interface at the fiber-optic arrays at all times during the connectors' use. Furthermore, prior connectors and ferrules do not provide accurately machined grooves to house the individual fibers so as to ensure good mechanical registration of the fibers within the ferrules. This results in a generally unreliable connector which introduces a high probability of data error when optical information is bussed through the connector.

There therefore exists a long-felt need in the art for fiber-optic connectors which ensure consistent, high quality data communication. This long-felt need extends to fiber-optic connectors having ferrules which can be machined with high precision and accuracy in the submicron range to hold the individual fibers of the fiber-optic array in registration in the ferrules. There further exists a long-felt need in the art for techniques to machine ferrules for use in connectors having fiber-optic arrays which will ensure that the fiber-optic arrays can be both simply registered in the ferrules, and held in precise alignment with other fiber-optic arrays in the connector. Such results have not heretofore been achieved in the art.

SUMMARY OF THE INVENTION

The aforementioned problems and long-felt needs are solved by high density fiber connectors provided in accordance with the present invention. Preferably, the connectors comprise a connector body, a connector ferrule within the connector body to receive and house at least one fiber which will carry data through the connector, and at least one groove cut into the ferrule by an electrical discharge machining process, the groove being adapted to secure the fiber in registration within the ferrule. Even more preferably, the high density fiber connector comprises at least one array of grooves cut into the ferrule by the electrical discharge machining process wherein the array of grooves is formed in the ferrule at equidistant points on a common centerline.

In a preferred embodiment of high density fiber connectors provided in accordance with the present invention, each of the grooves within the array of grooves further comprises at least one undercut section adapted to hold the fiber securely within the groove so that the fiber resists undergoing radial movement. Most preferably, the ferrule comprises stainless steel, and further comprises a first ferrule member having configured thereon by the electrical discharge machining process at least one guide pin hole for housing a guide pin found on another ferrule in the connector, the guide pin and guide pin hole adapted to hold the individual fibers in the first ferrule in precise alignment with fibers that are interfaced in the second ferrule.

In a further preferred aspect of the present invention, the guide pin hole further comprises a series of detented cutaway areas for engagement with the guide pin, and at least one lateral cutout area formed by the electrical discharge machining process which resiliently holds the guide pin in the guide pin hole. Even more preferably, the connector comprises a second ferrule member in engagement with the groove for clamping the fiber in registration in the groove so that the fiber is held in precise alignment in the connector and so that data is transmitted through the connector with a minimum of transmission error. Since a significant obstacle in all fiber-optic transmission is the transmission loss caused by misalignment of fibers in separate fiber-optic arrays, the arrangement provided in accordance with the present invention which eliminates fiber-optic array misalignment solves this problem.

High density fiber array connectors provided in accordance with the present invention having grooves and guide pin holes formed therein by an electrical discharge machining process provide registration of fibers in a fiber-optic array within the grooves so as to prevent radial movement of the fibers in the grooves during the connector's use, and precise alignment of the fiber-optic arrays in separate halves of the connectors. This ensures low loss and high quality data transmission through the connector at all times. Such results have not been achieved consistently in the art.

The invention will be best understood by reading the following detailed description in construction with the drawings which are first described briefly below.

BRIEF DESCRIPTION OF THE DRAWINGS

FIGS. 6A–9B are schematic representations of grooves which can be machined in ferrules using electrical discharge machine techniques for housing fiber-optic arrays so that the ferrules provided in accordance with the present invention can hold the fiber optic arrays in registration in the grooves, and in precise alignment with other fiber-optic arrays in the connector.

FIGS. 10A and 10B are schematic representations of a single groove having undercuts therein for housing a fiber-optic waveguide, wherein the groove and undercuts are machined by using electrical discharge machining techniques.

FIG. 11 is a schematic representation of a guide pin hole having a guide pin inserted therein, the guide pin hole having been machined by electrical discharge machining techniques so that the guide pin hole is spring-loaded.

DETAILED DESCRIPTION OF PREFERRED EMBODIMENTS

Figure 1:
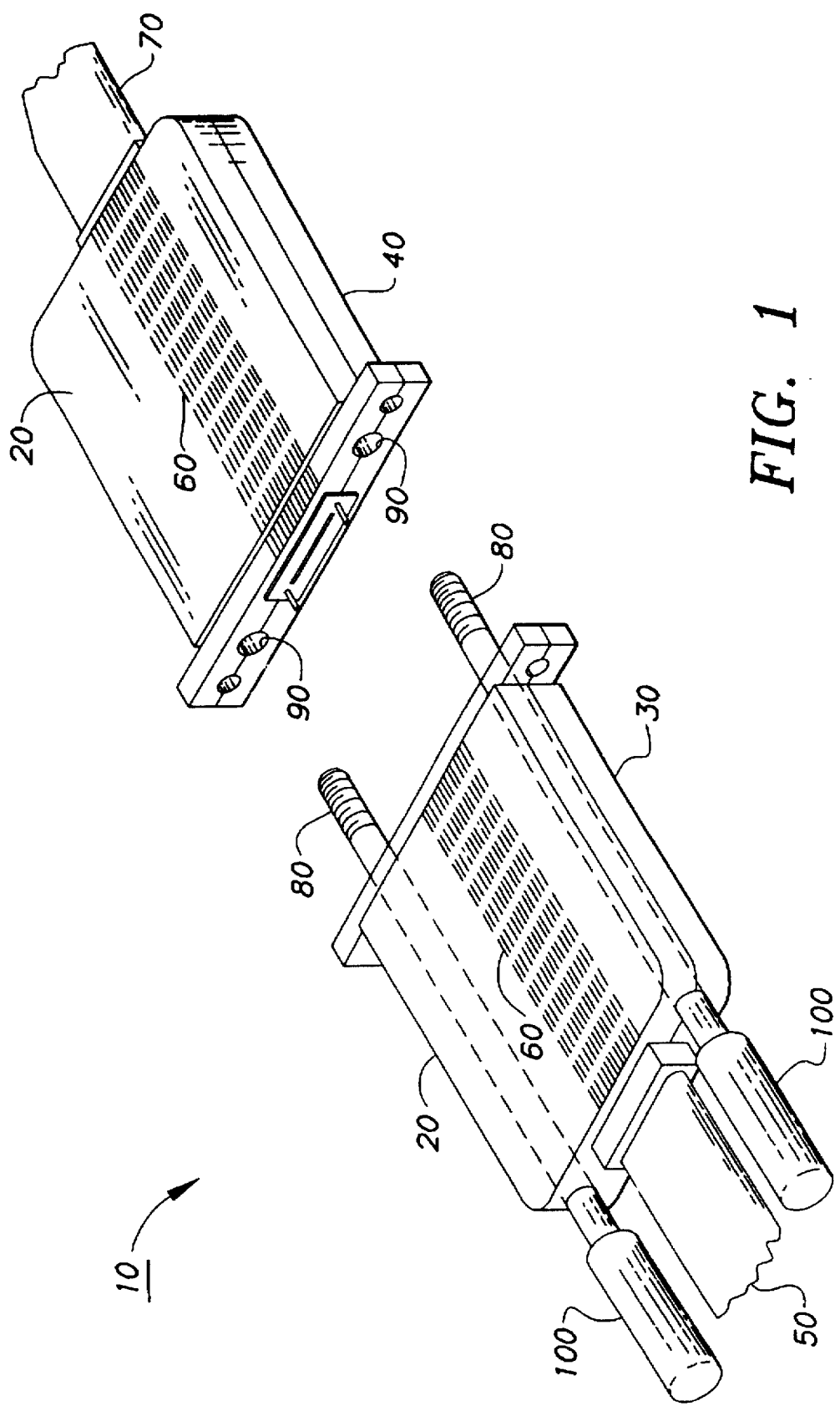
FIG. 1 is an exploded isometric view of a high-density fiber-optic connector provided in accordance with the present invention having ferrules which are machined using electrical discharge machining techniques.

Referring now to the drawings wherein like reference numerals refer to like elements, a high-density fiber-optic connector is shown at 10 in FIG. 1. Preferably, the connector comprises a connector body 20 which is made conventionally of a nylon 6—6 or glass-filled polycarbonate material. The connector 10 comprises two halves, a male half 30 and a female half 40. A fiber-optic ribbon 50 is mechanically interfaced through the back end of the male half 30 and comprises a fiber-optic array, shown generally at 60, having individual waveguides. The male half 30 of the connector also preferably comprises a ferrule (not shown in FIG. 1) at which the fiber-optic array 60 is terminated. The ferrule comprises a plurality of U-shaped lead-ins which axially traverse the ferrule from end to end and which terminate in grooves to be described more fully herein. The individual fibers or waveguides of array 60 are inserted through the lead-ins at the rear end of the ferrule and axially threaded therethrough to the front end of the ferrule. The fibers are terminated at the front end of the ferrule and male half 30 where they can be interfaced to other elements in the connector.

The individual fiber-optic waveguides in array 60 are adapted to transmit data information through the connector. The information takes the form of light energy which is transmitted through each waveguide in the array to other points of the connector. The array is received and housed in the ferrule, and preferably a similar array 60 is found in the female half 40 which also contains a fiber-optic ribbon shown generally at 70. The male half of the connector further preferably comprises two securing screws 80 which are adapted to mate with two screw holes 90 in the female half 40. A pair of lugs 100 are each interfaced to the ends of the screws 80 and are provided to turn the screws in the screw holes 90 so as to Cinch the two halves 30 and 40 of the connector together when the connector is in use.

Figure 2A:
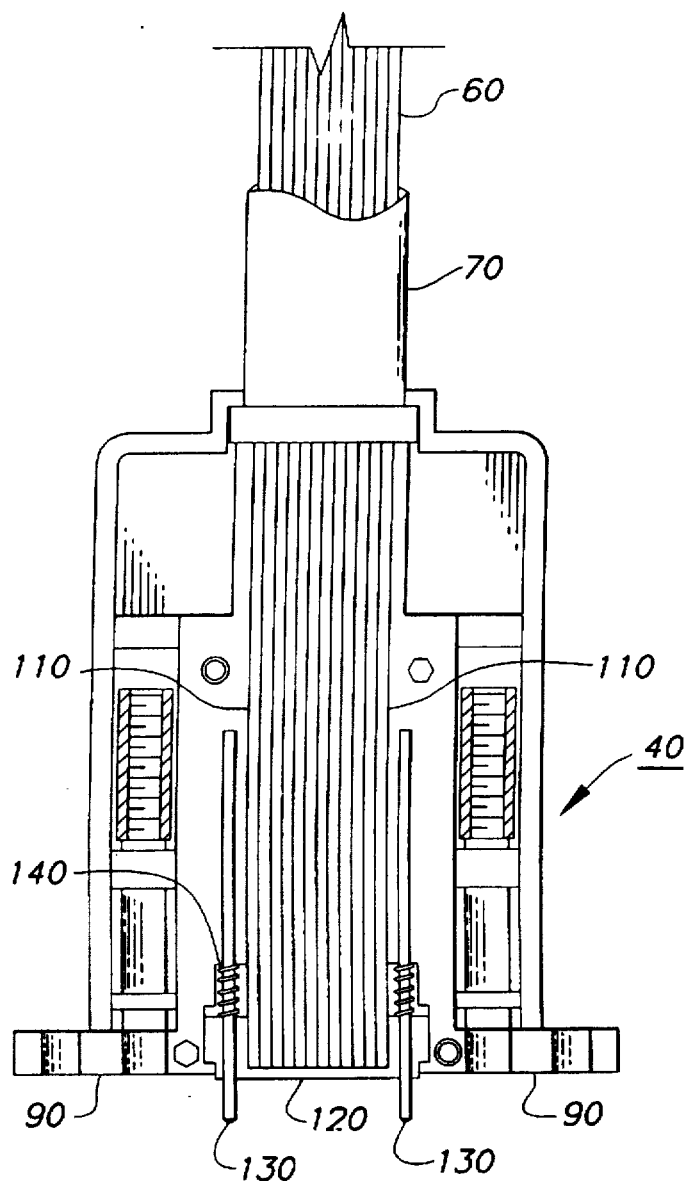
FIGS. 2A and 2B are plan and elevation views respectively of a female half of the high density fiber-optic connector of FIG. 1.
Figure 2B:
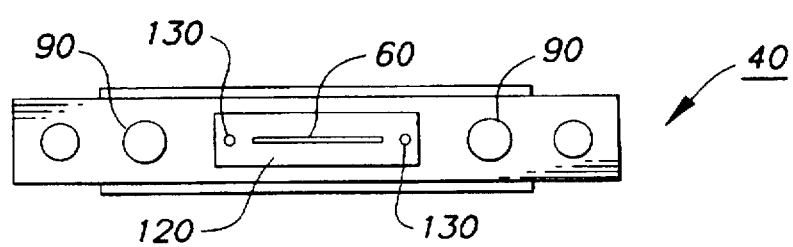

Referring now to FIGS. 2A and 2B, the female half 40 of the connector 10 is shown, and in FIG. 2A the connector body is broken away to reveal the fiber-optic array 60 traversing through the female half. The array 60 preferably comprises a plurality of individual optical fibers or waveguides shown generally at 110. The individual fibers in the array are terminated in a ferrule shown at 120 which is adapted to receive and house the individual fibers 110 to hold the array 60 in registration in the female half 40.

More preferably, ferrule 120 is a male ferrule since it further comprises two guide pins 130 which are adapted to interface with two guide pin holes in a female ferrule which is found in the male half 30 of connector 10. A pair of resilient springs are provided shown generally at 140 which cause ferrule 120 to be spring-loaded so that when the guide pins 130 are interfaced with the guide pin holes, the resilient springs relieve overpressure that is impressed upon the ferrule beyond that which is necessary to hold fiber-optic array 60 in registration with the fiber-optic array found in the male half 40. As will be explained more fully hereinafter, ferrule 120 further comprises a set of grooves which are formed in the ferrule by an electrical discharge machining process which cause the fibers to be secured in the ferrule in registration, and in precise alignment with fibers in the fiber-optic array found in the male half of the connector.

Figure 3A:
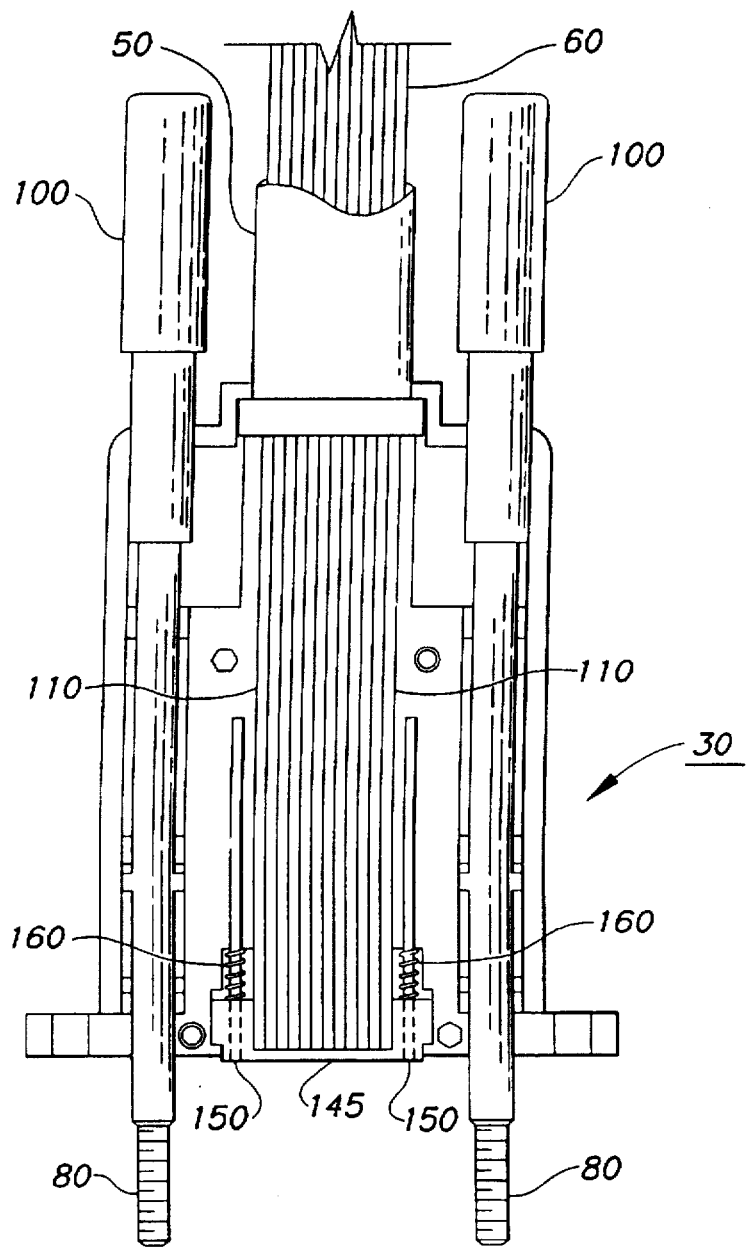
FIGS. 3A and 3B are plan and elevation views respectively of a male half of the high-density fiber-optic array of FIG. 1.
Figure 3B:
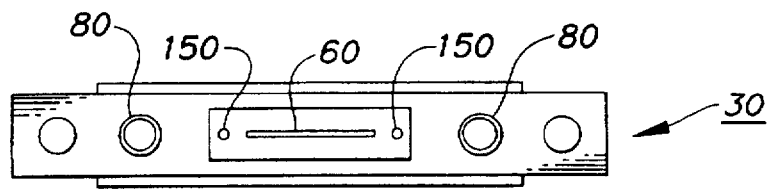

FIGS. 3A and 3B are similar views of the male half 30 of connector 10. In the male half, a female ferrule shown at 145 houses the fiber-optic array 60. Preferably, female ferrule 145 comprises two guide pin holes shown generally at 150 which are adapted to receive the individual guide pins 130 found on the male ferrule 120. A pair of resilient springs 160 are provided to female ferrule 145 for alleviating any overpressure which exists when the guide pins enter the guide pin holes and the connector halves are cinched together by lugs 100 and screws 80. As also will be explained more fully hereinafter, guide pin holes 150 are formed in female ferrule 145 by an electrical discharge machining process.

Figure 4A:
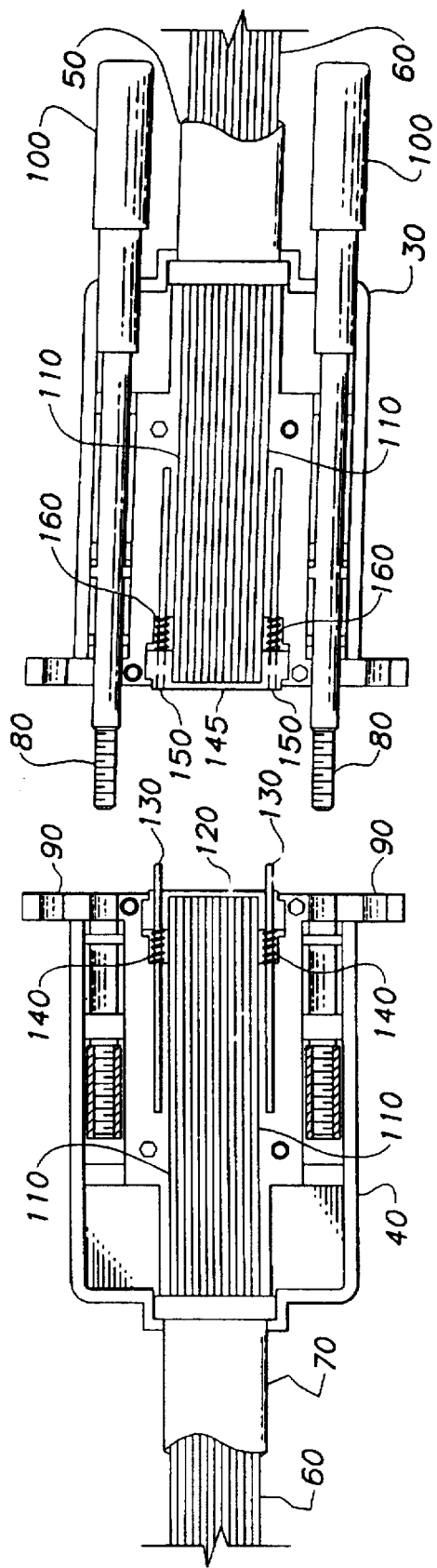
FIGS. 4A and 4B are de-mated and mated views respectively of the high-density fiber-optic connector of FIG. 1.
Figure 4B:
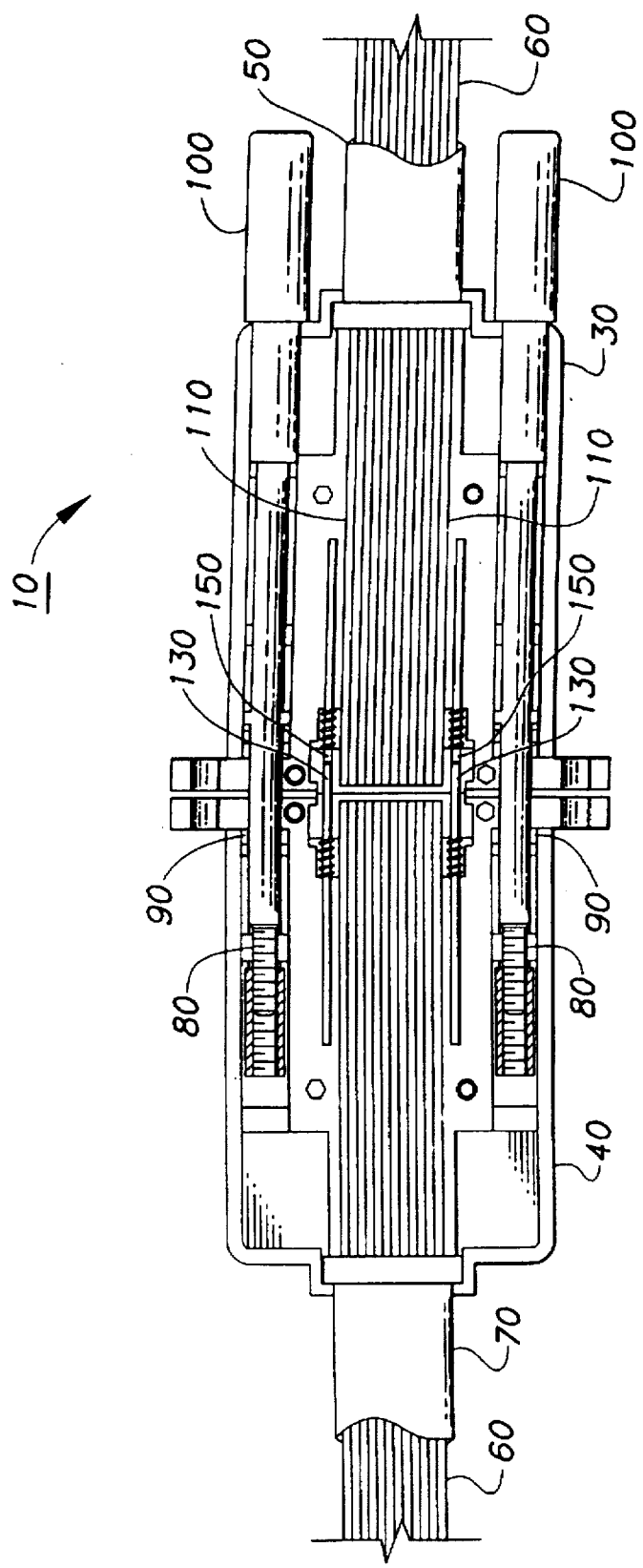

Referring now to FIGS. 4A and 4B, the mechanical mating of the two connector halves 30 and 40, and therefore of the guide pins 130 into the guide pin holes 150, is illustrated. Conventionally, the screws 80 will first be initially aligned with the screw holes 90. The two halves of the connector are then initially placed together as the screws 80 fit within screw holes 90. By pushing the two halves 30 and 40 together, the guide pins 130 are initially brought into engagement with the guide pin holes 150 via a lead-in chamfer, and therefore, each of the ferrules are brought together.

Figure 12:
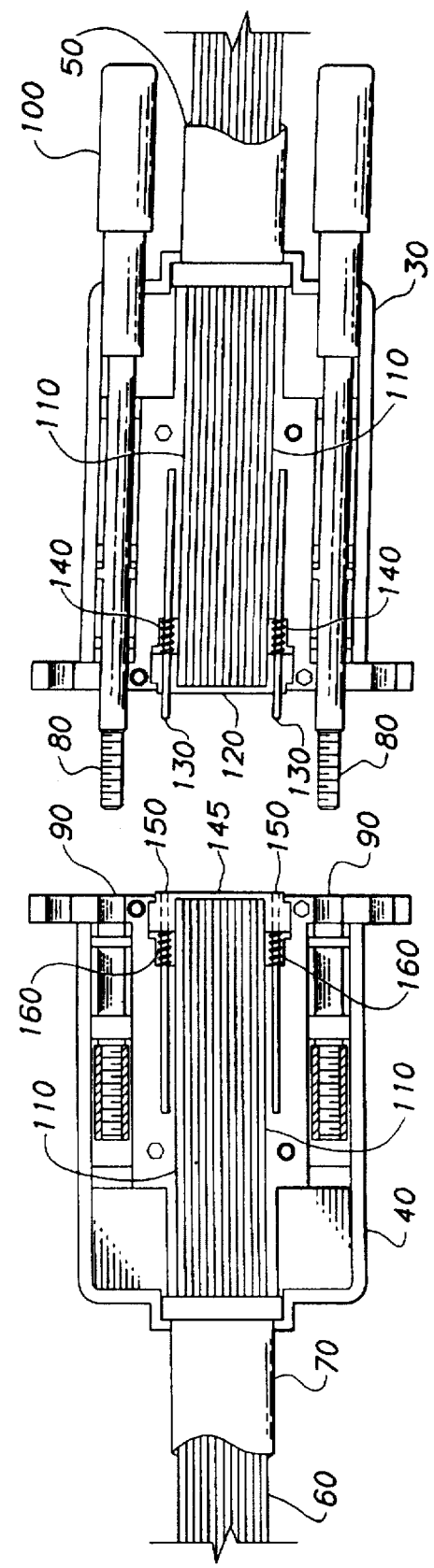
FIG. 12 is a de-mated view of another preferred embodiment of a high-density fiber-optic connector provided in accordance with the present invention.

It is critically important that the guide pins 130 in male ferrule 120 be precisely and accurately interfaced in the guide pin holes 150. This ensures that the two fiber-optic arrays 60 will be brought into precise alignment so that each of the individual waveguides in array 60 are both mechanically and optically closely aligned. Thus, data can be transmitted through the waveguides and through connector 10 with speed and accuracy. It will be appreciated by those with skill in the art that female half 40 may have housed therein a female ferrule 145, while male half 30 may have a male ferrule 120 housed therein. This arrangement is substantially shown in FIG. 12. Regardless in which half of the connector the female or male ferrules reside, the operation of the invention and the advantages achieved thereby are the same. The invention should be understood to be equally applicable to either arrangement.

Figure 5A:
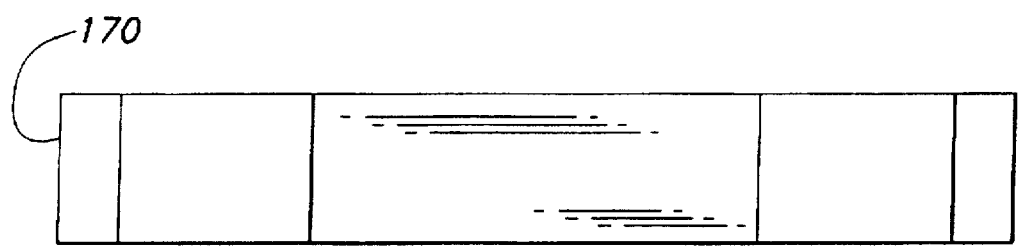
FIGS. 5A, 5B and 5C are elevation views of a ferrule provided in accordance with the present invention having undercut grooves and guide pin holes which have been machined therein using electrical discharge machining techniques.
Figure 5B:
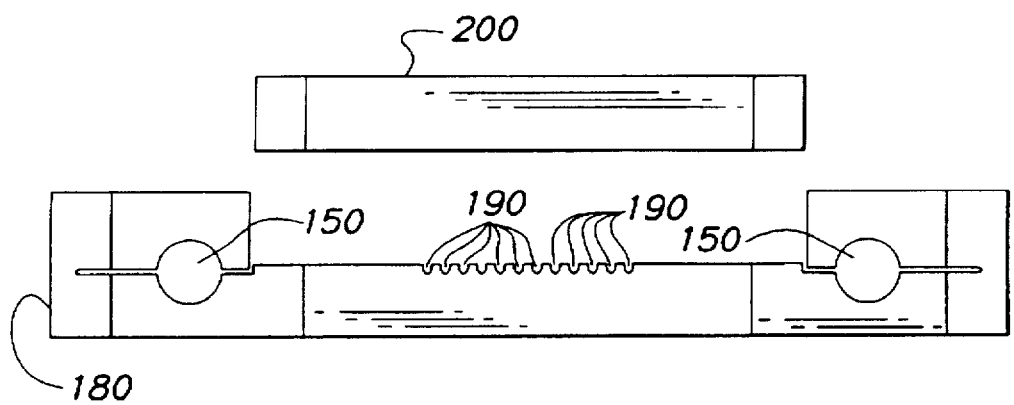
Figure 5C:
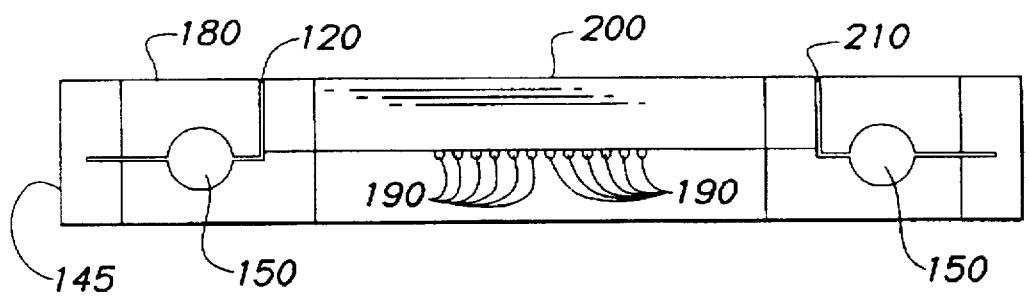

The guide pin holes 150 and individual grooves which hold the fiber-optic waveguides 110 in registration in the ferrules are preferably formed in the ferrules by an electrical discharge machining process. The process of forming grooves and guide pin holes in ferrules by electrical discharge machining (hereinafter referred to as "EDM") is illustrated in FIGS. 5A-5C. By means of traveling wire EDM, any electrically conductive material can be cut or sliced into any shape or configuration with an accuracy or resolution as small as 0.1 microns. The size or width of the cut is a function of the wire size. Typically, wire diameters in EDM processes can be as small as 0.002 inches, and will leave a cut during machining which is approximately 10% to 20% larger than the wire size used. Thus, by selection of the proper wire size, discharge arc, and the particular material to be machined, the EDM cut can be controlled in the sub-micron range.

Travelling wire-type EDM machines are known to those with skill in the art. The EDM process calls for juxtaposing a traveling, continuous wire-type electrode and a moving table or pair of tables on which a metal workpiece is mounted. Typically, a start hole has been drilled in the workpiece for threading the wire electrode. The wire travels from a supply reel so that new electrode wire surfaces are continually introduced to the EDM process, which is essentially an erosion process.

The table or tables move to continually position the metal workpiece according to the progress of the process, and the desired geometry of the finished part to be machined out of the workpiece. Electrical energy taking the form of successive electrical discharges between the moving wire and workpiece is applied through a machining fluid which typically is a liquid dielectric. The electrical energy thus removes material from the workpiece as the table or tables continually position the workpiece relative to the axially moving wire. An exemplary rotary table wire EDM machine for travelling EDM wire is illustrated in U.S. Pat. No. 4,841,126, Graeber, Jun. 20, 1989, the teachings of which are specifically incorporated herein by reference.

By employing an EDM process such as that described above, the ferrule 145 can be formed by EDM. In a preferred embodiment, the ferrule begins as a "blank" shown generally at 170. The ferrule blank is an electrically conductive material which forms the workpiece to be used in the EDM process. More preferably, the blank 170 is stainless steel which is advantageously used since it resists rusting and is particularly amenable to the EDM process. The ferrule blank 170 can be cut into two or more pieces (an insert and a parent) in such a manner that the pieces can be assembled like the pieces of a puzzle, less the width cut during the EDM process. During machining, additional intermediate cutouts can be made. In accordance with the invention, cutouts can be made in the configuration of an array of equidistant grooves on a common centerline, and guide pin holes as described for the alignment of the two ferrules in the connector.

In FIG. 5B, a first ferrule member 180 (the parent) has the guide pin hole 150 configured thereon by an EDM process. A plurality of grooves 190 for housing the plurality of fibers 110 in the fiber-optic array 60 are also formed by EDM in the first ferrule member 180. Preferably, a second ferrule member 200 (the insert) is provided to engage with at least the plurality of grooves 190. The second ferrule member 200 engages the grooves and clamps the plurality of fibers 110 in registration with the grooves so that the plurality of fibers can be held in precise registration in the ferrule. This allows data to be transmitted through the connector with a minimum possibility of transmission error, since the grooves 190 hold each of the individual fibers 110 securely registered therein.

FIG. 5C illustrates the engagement of the first and second ferrule members after both of the guide pin holes 150 and the plurality of grooves 190 have been formed in the first ferrule member by EDM. The width of the wire used during the EDM process is shown by the cutouts 210 in the completed ferrule 145. Second ferrule member 200 fits securely in the first ferrule member 180 to clamp the wires in grooves 190. It will be recognized by those with skill in the art that the second ferrule member 200 could also have grooves configured therein by an EDM process so that individual fiber waveguides of the fiber-optic array can be housed in registration in the second female member. Since EDM is a very precise process which uses wire diameters as small as 0.002 inches, very precise groove configurations and waveguide placement can be achieved in ferrules provided in accordance with the present invention.

The individual waveguide fibers in the array typically have an outer diameter of about 125 microns. However, single mode fibers have an inner core of only about 8.3 microns, while multimode waveguides have an inner core of about 62.5 microns. In prior fiber-optic connectors, it is usually very difficult to align the fibers in the two halves when single mode fibers are being used. Even when the larger core diameter multimode waveguides are to be utilized in a fiber-optic connector, it is often quite difficult in prior connectors to align the fiber-optic arrays precisely. This introduces data transmission errors when the connectors are in use. In accordance with the present invention, since the individual grooves 190 are configured in the ferrule by an EDM process, the grooves themselves can be configured to nearly the same size as the outer diameter of the waveguides. Thus, with the ferrules and fiber-optic connectors disclosed and claimed herein, the individual fibers of the fiber-optic arrays in each of the two halves of the connectors will be firmly held in place within the grooves and will adequately resist axial or radial motion. When the two halves of the connectors are joined, and the guide pins in the male ferrule interface with the guide pin holes in the female ferrule, precise alignment of two or more fiber-optic arrays in the two connector halves is achieved, thereby ensuring that the terminated connections are aligned and held in place for all times that the connector is in use. Such results have not heretofore been achieved consistently in the art and evince a great advantage over prior fiber-optic connectors.

FIGS. 6A through 9B illustrate several preferred groove configurations 190 made by EDM for ferrules provided in accordance that of the with the present invention. FIGS. 6A and 6B illustrate a semicircular groove cut in both the first ferrule member 180 and the second ferrule member 200. Both of these semicircular grooves are configured using EDM and when the first ferrule member and second ferrule member are brought together, the fiber-optic waveguide 110 fits securely in the circular groove so formed. FIGS. 7A and 7B illustrate configuring only the first ferrule member 200 with a partially cylindrical groove by EDM while the second ferrule member acts merely to clamp fiber-optic waveguide 110 in partially cylindrical groove 190.

FIGS. 8A and 8B illustrate yet another preferred groove configuration wherein a partial elliptical groove is cut in both the first and second ferrule members. When the first and second ferrule members are brought together, the fiber-optic waveguide 110 fits in a substantially elliptical groove as shown in FIG. 8B. In yet a further preferred embodiment of groove configurations provided in accordance with the present invention, in FIGS. 9A and 9B the first ferrule member 180 contains a partially elliptical groove configured therein by an EDM process, while the second ferrule member acts as a clamp to hold the fiber-optic waveguide 110 in place in the groove.

In an even more preferred embodiment, FIGS. 10A and 10B illustrate a single groove 190 formed in the first ferrule member 180 by an EDM process. Groove 190 further comprises two undercut sections shown generally at 220 which are formed in the first ferrule member 180 and groove 190 by the EDM process. Undercuts 220 serve to hold the fiber-optic waveguide 110 securely within the groove 190 so that the waveguide resists radial movement within the groove when the connector halves are mated.

Preferably, the individual fiber-optic waveguides are axially inserted into grooves 190 from U-shaped lead-in insertions, and then threaded from one end of the ferrule to the other. In this fashion, each fiber-optic waveguide is threaded along the axis of each groove until it is terminated at the end of the ferrule. The ferrule end face can then be polished flat or at an oblique angle. The oblique angle polish reduces back reflection which is a feature that is desirable for certain single mode applications.

Although it would be possible to "snap-fit" each fiber-optic waveguide radially through each cutout portion 220, it is preferable to insert the waveguides axially in the ferrule. When the waveguides are so inserted, they can be precisely aligned with waveguides in another ferrule in the connector. Thus, with grooves provided in accordance with the present invention that are cut by an EDM process, precise alignment of the fiber-optic waveguides in a fiber-optic array is consistently and uniformly achieved. This ensures that data transmission through the fiber-optic array and connector is of a consistently high quality, and free of errors which are introduced due to misalignment of the fibers of each of the two fiber-optic arrays found in the separate halves of the connector.

The EDM process also allows guide pin holes 150 to be very precisely machined in the first ferrule member. Referring to FIG. 11, the profile of a preferred guide pin hole made by EDM in accordance with the present invention is shown. The traveling wire in the EDM process cuts a hole profile corresponding to the correct diameter for the guide pin. The guide pin hole is preferably cut with a series of detented areas shown at 230, and cut away areas shown generally at 240. The detented areas 230 are areas on the circumference of the guide pin hole 150 where the stainless steel material of the ferrule actually contacts the guide pin 130. The cutaway areas 240 act in cooperation with the detents 230 to reduce the insertion force of the guide pin 130 within the guide pin hole 150 while maintaining a tight fit. Lateral cutout areas 250 provide a spring insertion effect to the guide pin hole, thereby yielding a secure and precise alignment of the guide pin 130 in the guide pin hole 150, and therefore, precise alignment of the two ferrules found in the separate halves of the connector.

Thus, since only partial or point contact is obtained between the circumference of the guide pin 130 and guide pin hole 150 due to the detents 230, and since the lateral cutouts 250 provide resilient spring contact of the guide pin with the guide pin hole, an efficient and uniform mechanism is achieved in accordance with the present invention for aligning the two ferrules in the connector. Such results have also not heretofore been achieved in the art.

High density fiber-optic array ferrules and connectors provided in accordance with the present invention provide precise alignment of the ferrules in the connectors, and therefore precise alignment of the individual fiber-optic waveguides in fiber-optic arrays typically found in such connectors. By employing an EDM process as described above, machining of microholes or grooves in the tolerance ranges needed for single mode and multimode optical fibers can be achieved in any configuration. Thus, high density fiber-optic connectors provided in accordance with the present invention ensure consistent and high quality data transmission therethrough for all applications. These results have not been achieved in the art with prior fiber-optic ribbon connectors, and therefore solve long-felt needs in the art for fiber-optic array ferrules and connectors that provide high quality and accurate data transmission for all single mode and multimode applications.

There have thus been described certain preferred embodiments of high density fiber-optic ferrules and connectors provided in accordance with the present invention. While preferred embodiments have been described and disclosed, it will be recognized by those with skill in the art that modifications are within the true spirit and scope of the invention. The appended claims are intended to cover all such modifications.

What is claimed is:

1. A fiber optic array ferrule comprising:
   plurality of fiber receiving grooves, the ferrule having substantially semiannular surfaces disposed opposite each other which together comprise a guide pin hole, the ferrule further having a single lateral cutout adjacent a web that positions and separates the semiannular surfaces whereby the guidepin hole exhibits resilience for receiving and clamping a guide pin therein.

2. The ferrule as recited in claim 1 wherein said semiannular surfaces have a plurality of detented areas for point contact of the guidepin.

3. The ferrule as recited in claim 2, wherein said detented areas have an arc shape that follows a profile of a guidepin.

* * * * *